E. L. WAGNER.
TUBE SPLITTER.
APPLICATION FILED JUNE 20, 1917.
1,276,458.
Patented Aug. 20, 1918.
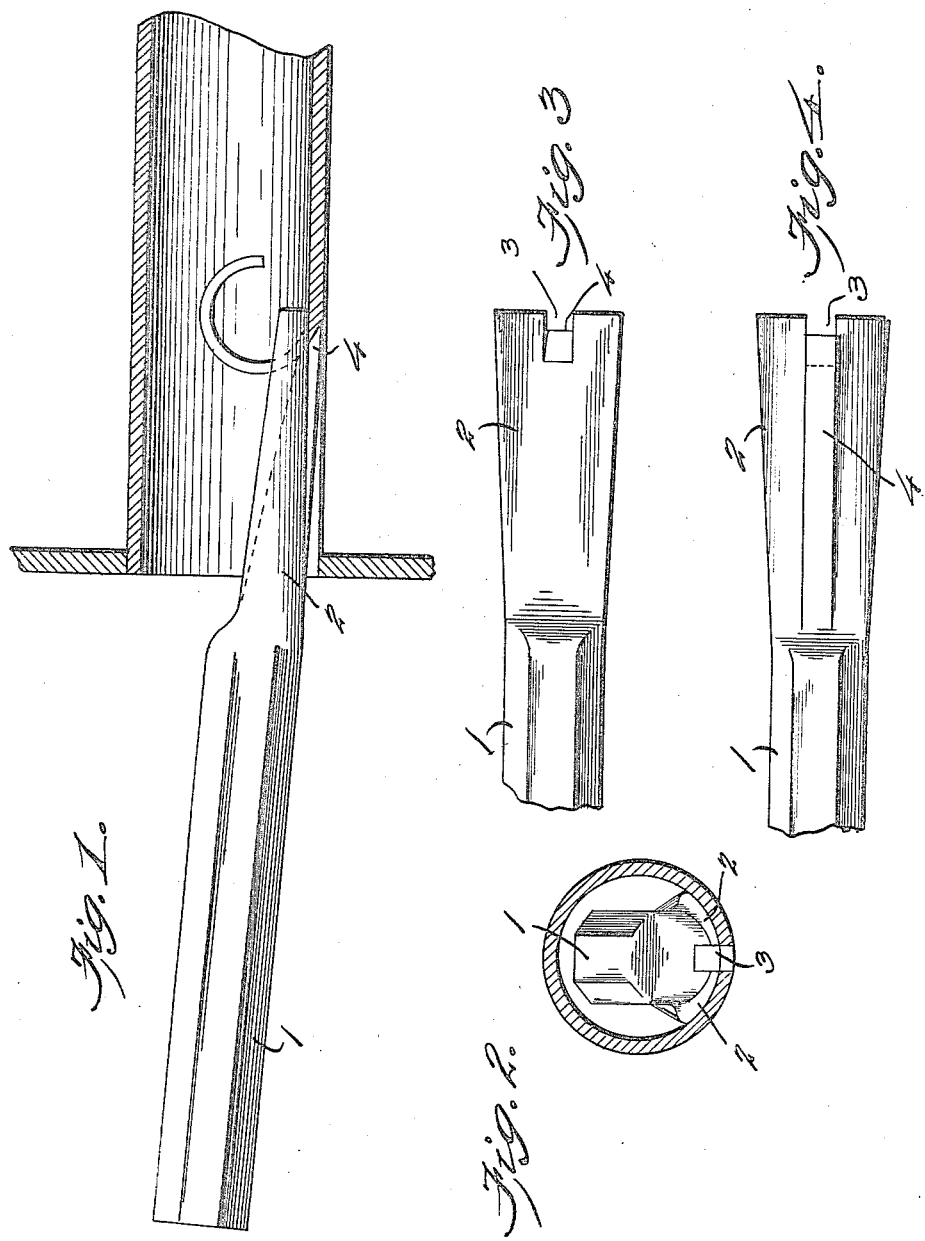
WITNESSES
INVENTOR
Elbert L. Wagner,
BY
ATTORNEY

UNITED STATES PATENT OFFICE.

ELBERT LOYD WAGNER, OF PACKARD, KENTUCKY.

TUBE-SPLITTER.

1,276,458. Specification of Letters Patent. Patented Aug. 20, 1918.

Application filed June 20, 1917. Serial No. 175,899.

*To all whom it may concern:*

Be it known that I, ELBERT L. WAGNER, a citizen of the United States, residing at Packard, in the county of Whitley and State of Kentucky, have invented certain new and useful Improvements in Tube-Splitters, of which the following is a specification.

This invention relates to new and useful improvements in tools and the principal object of the invention is to provide a device for facilitating the removal of boiler tubes from the tube plates so as to replace them by new ones.

Another object of the invention is to provide a device which will cut a strip from the tube without injuring the tube plate.

A further object of the invention is to cut a strip lengthwise from the tube so the tube may be reduced in diameter and thus easily released from the tube plate and passed through the hole therein.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which:

Figure 1 shows the tool in use, with the boiler tube in section.

Fig. 2 is an end view with the tube in section.

Fig. 3 is a top view of the cutting end of the tool.

Fig. 4 is a bottom view thereof.

In these figures 1 indicates the shank having its cutting end 2 tapered and bent slightly out of the longitudinal plane of the shank. At its outer part the said end is of semi-circular form and is provided with a notch 3 which extends inwardly from the extreme edge of the end and is disposed centrally thereof. A tooth 4 is located below this notch and the inner wall of the notch is inclined and forms a continuation of the cutting face of the tooth, which is also inclined. This tooth extends rearwardly along the bottom of the cutting end and gradually decreases in thickness toward the shank. The tooth has parallel side walls and a flat bottom wall and at its cutting point said tooth is of substantially the same thickness as the metal of the tube. The edge of the cutting end is slightly in advance of the tooth and this edge conforms to the shape of the inner wall of the tube.

In using the device it will be seen that the extended edge on each side of the notch will rest on the inner wall of the tube while the tooth is in engagement with the end edge of the tube. Due to the inclination of the end in relation to the shank the head of the tool is in correct position to be struck by a hammer and the blows will force the tooth through the metal while the curved part will slide on the inner wall of the tube. The strip of metal cut from the tube will pass up through the notch and curl up as shown in Fig. 1. After this strip has been cut a slight blow on the tube will cause it to leave the tube plate and it may be easily taken from the same.

It is thought from the foregoing that the advantages and novel features of my invention will be readily apparent.

I desire it to be understood that I may make slight changes in the construction and in the combination and arrangement of the several parts, provided that such changes fall within the scope of the appended claims.

I claim as my invention:

1. A tube splitter, comprising a bar having an end portion flattened and notched in its extremity, and having an outer projection in line with the notch beveled on its upper side to provide a chisel edge adjacent the notch.

2. A tube splitter, comprising a bar having an end portion flattened and transversely curved, and having a centrally disposed notch in its extremity and an outer longitudinal projection in line with the notch and tapering rearwardly, and having its upper side beveled to provide a chisel edge adjacent the notch.

In testimony whereof I affix my signature in presence of two witnesses.

ELBERT LOYD WAGNER.

Witnesses:
CARL PETERS,
H. J. JONES.